United States Patent [19]

Yokohama

[11] Patent Number: 5,524,202
[45] Date of Patent: Jun. 4, 1996

[54] METHOD FOR FORMING GRAPHIC DATABASE AND SYSTEM UTILIZING THE METHOD

[75] Inventor: Hideo Yokohama, Kawasaki, Japan

[73] Assignee: Fuji Xerox Co., Ltd., Kanagawa, Japan

[21] Appl. No.: 470,172

[22] Filed: Jun. 6, 1995

Related U.S. Application Data

[63] Continuation of Ser. No. 843,896, Feb. 27, 1992, abandoned.

[30] Foreign Application Priority Data

Mar. 1, 1991 [JP] Japan .................................. 3-036405

[51] Int. Cl.[6] ........................................................ G06F 3/14
[52] U.S. Cl. ............................................ 395/161; 395/164
[58] Field of Search ..................................... 395/153–155, 395/160–161, 164–166

[56] References Cited

U.S. PATENT DOCUMENTS

| | | | |
|---|---|---|---|
| 4,935,879 | 6/1990 | Ueda | 395/164 X |
| 4,945,499 | 7/1990 | Asari et al. | 395/164 X |
| 5,068,805 | 11/1991 | Tsuzuki | 395/164 |
| 5,134,697 | 7/1992 | Scheffler | 395/165 X |
| 5,136,690 | 8/1992 | Becker et al. | 395/161 |
| 5,148,522 | 9/1992 | Okazaki | 395/161 |
| 5,150,462 | 9/1992 | Takeda et al. | 395/164 X |
| 5,214,757 | 5/1993 | Mauney et al. | 395/161 |
| 5,249,265 | 9/1993 | Liang | 395/166 X |

*Primary Examiner*—Mark K. Zimmerman
*Assistant Examiner*—Cliff N. Vo
*Attorney, Agent, or Firm*—Welsh & Katz, Ltd.

[57] ABSTRACT

A graphic database system which comprises a memory unit, a mapping unit and a processing unit in which the memory unit stores a file in which graphic data such as map data expressed as an object in terms of a predetermined description based on an object oriented language is registered, the mapping unit maps the contents of the file on a memory space, and the processing unit accesses the mapped memory space to perform operations such as registering, deleting and updating operations over the graphic data of the file.

10 Claims, 14 Drawing Sheets

```
// COORDINATE class Point{
    double x,
           y;
public:
           .
           .
           .
    };
``` a point

FIG. 4(a)     FIG. 4(b)

```
// RECTANGLE
class Rectangle{
    Point origin,    // LEFT LOWER
                        COORDINATE
           corner;   // RIGHT UPPER
                        COORDINATE
public:
         .
         .
         .
    };
```

| Origin | X1 |
|        | Y1 |
| Corner | X2 |
|        | Y2 |

```
// COORDINATE STRING (POLYGON)
class Path{
        Rectangle   box;        // BOUNDARY RECTANGLE
                                //    OF COORDINATE STRING
        int         npts;       // NUMBER OF APEXES
        Point       ptlist[1];  // VARIABLE LENGTH
public:                         //    OBJECT
           .
           .
           .
};
```

| box | Origin | $X_1$ |
| | | $Y_1$ |
| | Corner | $X_2$ |
| | | $Y_2$ |
| npts | | 5 |
| ptlist [0] | | $X_1$ |
| | | $Y_1$ |
| ptlist [1] | | $X_2$ |
| | | $Y_2$ |
| ptlist [2] | | $X_3$ |
| | | $Y_3$ |
| ptlist [3] | | $X_4$ |
| | | $Y_4$ |
| ptlist [4] | | $X_5$ |
| | | $Y_5$ |

Newton 800#'s
 Domestic Air Carriers
 International Air Carriers
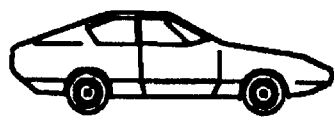 Auto Rental Agencies
 Hotels. Motels Inns
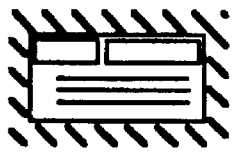 Epress Mail Package Service
 Flowers, Gourmet Food & Gifts
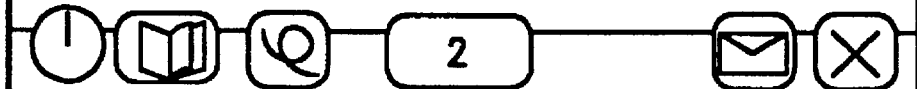
FIG. 8

Newton 800 Numbers

Domestic Air Carriers

| | |
|---|---|
| Alaska | (800) 426-0333 |
| Aloha Airlines | (800) 227-4900 |
| America West | (800) 247-5692 |
| American | (800) 433-7300 |
| Continental | (800) 525-0280 |
| Delta | (800) 221-1212 |
| Mesa Airlines | (800) 637-2247 |
| Midwest Express | (800) 452-2022 |
| Northwest | (800) 225-2525 |
| Southwest | (800) 531-5601 |
| Trans World | (800) 221-2000 |
| US Air | (800) 428-4322 |
| United | (800) 241-6522 |

*9:45, Flgt.610* — 368

*9:20, Flight 309* — 366

FIG. 9

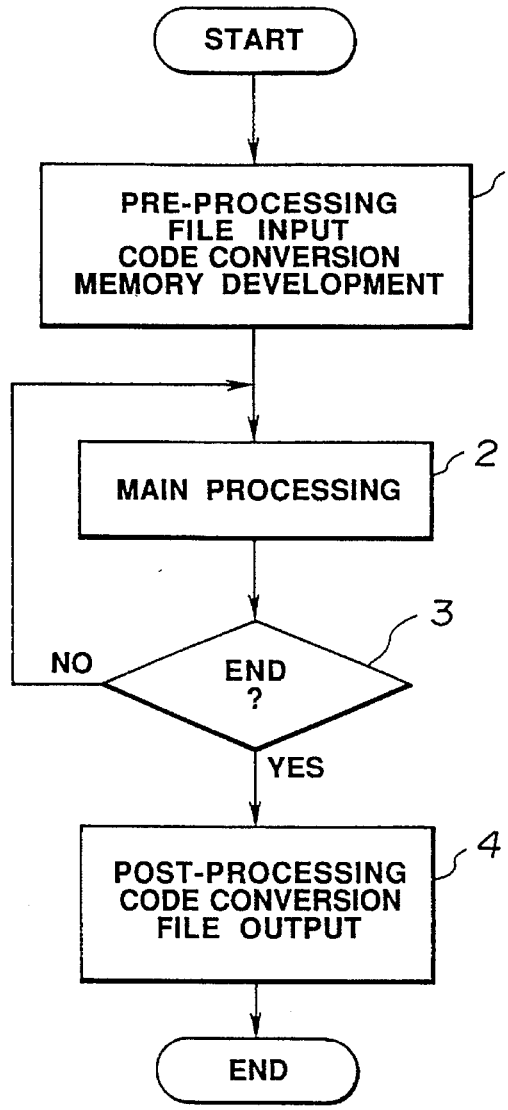
FIG. 22 *(PRIOR ART)*
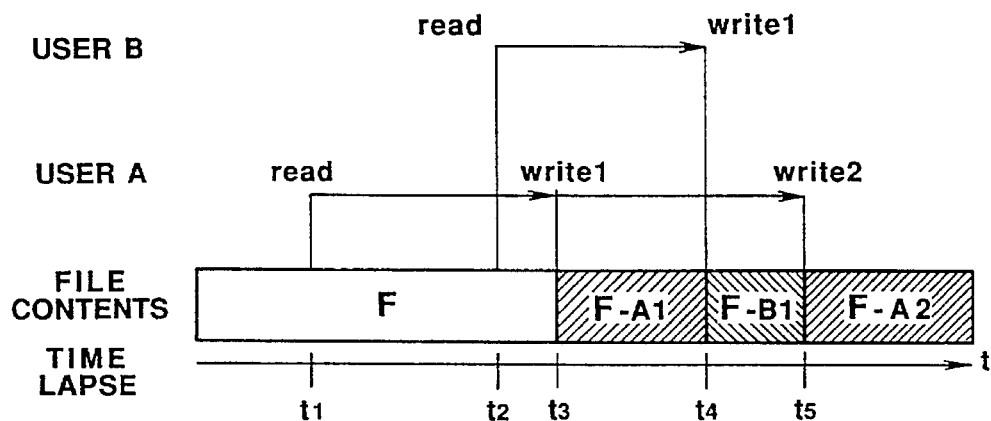
FIG. 23 *(PRIOR ART)*

METHOD FOR FORMING GRAPHIC DATABASE AND SYSTEM UTILIZING THE METHOD

This application is a continuation of the application Ser. No. 07/843,896 filed Feb. 27, 1992, now abandoned.

BACKGROUND OF THE INVENTION

1. Field of the Invention

The present invention relates to a method for forming a graphic database on such graphic data as map data and a system utilizing the method.

2. Description of the Related Art

There has been recently realized a map database system in which map data including points, lines and planes are formed into a database to enable a computer to display, retrieve and analyze geographical data.

With such a map database system, upon formation of map data into a database, the map data are made in the form of standard geometric models to realize efficient data processing. For example, the map data are made in the form of individual point models, individual line models, individual plane models, network models, area division models, etc.

The data structures of the individual point model and the individual line model will be briefly explained.

As shown in FIG. 19(a), the individual point model is regarded as an assembly of independent geographical objects and expressed in the form of such a point file F1 having a file format as shown in FIG. 19(b). In the exemplary file shown in FIG. 19(b), X-Y coordinate points (x1, y1) to (x4, y4) are registered for corresponding point numbers P1 to P4.

Meanwhile, with respect to the individual line model, as shown in FIG. 20(a), a geographical object is regarded as an independent line (assembly of elapsed points) and the individual line model is expressed in the form of such a line file F2 having a file format as shown in FIG. 20(b). In the line file example shown in FIG. 20(b), X-Y coordinate start points (x11, y11) to (x14, y14) of line segments of a closed curve having a line number 11 and an X-Y coordinate end point (x15, y15)(which is the same as the start point of the start line segment) of the end line segment of the close curve are registered. Also registered similarly are data on a closed curve having a line number 12 in the line file F2.

As has been explained above, in the point and line files F1 and F2, a fixed length coordinate is put in a fixed length record and its coordinate value are often converted into a JIS code.

For details of such formation of map data into a model, formation of data into a database, utilization of a map database, etc. as mentioned above, refer to the following literatures (1) and (2).

(1) Zenjirou Kawai: "Digital Mapping", Kashima Shuppankai (Apr. 25, 1989), pp. 111–132.

(2) Shinto Horiike: "City Database", Keibun Shuppan K. K. (Dec. 10, 1987), pp. 75–97.

FIG. 21 schematically shows an arrangement of a prior art map database system which includes an external memory 1 for storing therein a line file 2 on map data, a main memory 3 and a central processing unit (which will be referred to as the CPU, hereinafter) 4.

Explanation will next be briefly made as to the file processing of the aforementioned map data file with reference to a flowchart of FIG. 22.

During the file processing of the line file 2 as a map data file, as shown in FIG. 22, the CPU 4, as a pre-processing, opens the line file 2 of the external memory 1 to read out map data (vector data) therefrom. The read-out contents is subjected to a code conversion and then written into the main memory 3 as map data (vector data) 5. Thereafter, a corresponding map (FIG.) 6 is developed on the main memory 3 on the basis of the code-converted map data 5 (step 1).

The CPU 4 then carries out main processing including the registration, reference/updating and deleting of the map data and also repeats this processing operation until the operation of the map data is completed (steps 2 and 3). After completing this main operation, the CPU 4 subjects the map data 5 to a code conversion and then closes the line file 2 as a post-processing (step 4). When the map data 5 is modified, its modification contents are written into the file when carrying out the post-processing.

The map data is formed as a map database through the aforementioned processing and when such a database is formed on a network, a plurality of users connected to the network can share the database.

However, the map database has such a file structure as "the data structure of a standard geometric model", as shown in FIGS. 19(a) and 20(b), and coordinate data are converted into JIS codes/EBSDIC codes to form a file so that, when it is desired to input a file, the contents of the opened file must be subjected to a code conversion and then the map data must be developed on the internal memory to perform the main processing, whereas, when it is desired to output a file, map data in the internal memory must be subjected to a code conversion and then the file must be closed, which results in a large overhead at the time of the file input and output.

Meanwhile, in a distributed processing or multi-user environment of a network, such a problem as file competition by a plurality of users has occurred. The file competition problem will be explained by referring to FIG. 23. In the drawing, "read" indicates that file contents was read out at a predetermined time, "write", "write1" and "write2" indicate that file contents was written at predetermined times respectively.

Assume now that a user A reads a content F of a file at a time point t1 and a user B reads the file content F at a time point t2 in FIG. 23. During a period between the time points t1 and t2, the file content F might be modified by the user A. In this case, however, since the modified content is not subjected to a write procedure, the file content read out by the user B is the same as that before the modification and thus might be different from the file content which the user A is working.

Next, when the user A writes at a time point t3 ("write1"), the file content F is renewed into the modified content which the user A is working (refer to a file content (F-A1) in FIG. 23). In this case, however, the renewed file content (F-A1) might be different from the file content which the user B is working).

Subsequently, when the user B writes at a time point t4 ("write1"), the file content (F-A1) renewed by the writing ("write1") of the user A is lost and instead renewed with the content modified by the working of the user B (refer to a file content (F-B1) in FIG. 23).

Further, when the user A writes at a time point t5 ("write2"), the file content (F-B1) renewed by the writing ("write1") of the user B is lost and instead renewed with the content modified by the working of the user A (refer to a file content (F-A2) in FIG. 23).

As has been explained in the foregoing, since a modification in the contents of a file will not reflect on its actual file content so long as a write working is not conducted, the contents of the user-A working file cannot match with the contents of the user-B working file.

In this way, the prior art map database system has had a difficulty that transfer processing for file input/output is required between the external memory and the main memory and the map data must be subjected to a code conversion in the transfer processing, which results in that an overhead at the time of the file input/output becomes very large.

In addition, when the map data developed on the main memory is modified, this modification will not reflect on the contents of the file so long as a writing procedure is not conducted. Therefore, in a multi-user environment of a network, when a file competition of a plurality of processes takes place, it becomes very difficult to keep a file matching.

SUMMARY OF THE INVENTION

It is an object of the present invention to provide a method for forming a graphic database which can reduce an overhead and keep a file matching even when a competition of a file by a plurality of users occurs and a system utilizing the method.

In order to attain the above object, a method for forming a graphic database in accordance with an aspect of the present invention comprises the steps of mapping on a memory space contents of a file in which graphic data expressed as an object in terms of a predetermined description based on an object oriented language is registered, and accessing the mapped memory space.

Accordingly, in the present invention, the contents of the file in which a group of graphic objects are registered are mapped on the memory space, and the mapped memory space is accessed, so that the contents of the file relating to the graphic object mapped on the memory space can be directly accessed.

Further, a graphic database system in accordance with another aspect of the present invention comprises memory means for storing therein a file in which graphic data expressed as an object in terms of a predetermined description based on an object oriented language is registered, mapping means for mapping contents of the file in the memory means on a memory space, and processing means for performing an operation over said file by accessing the memory space mapped by said mapping means. The file has a structure including at least a memory area in which a graphic object indicative of an object for predetermined graphic data is registered and also including a table for management of a registration location of the graphic object in the memory area.

Accordingly, in the present invention, the mapping means maps on the memory space the contents of the file relating to the graphic object in the memory means and the processing means performs operations (such as the registration, referencing/updating and deletion of the graphic object) over the file by accessing the mapped memory space, whereby the reading/writing of the graphic object from/in the mapped memory space to the reading/writing of the graphic object from/in the actual file. Further, when data on the mapped memory space is modified, the modified contents reflect on the contents of the file at all times.

Other objects and advantages of the present invention should become clear from the following description of the invention with reference to an embodiment shown in the accompanying drawings.

BRIEF DESCRIPTION OF THE DRAWINGS

FIGS. 4(a) and 4(b) show diagrams for explaining a map object in the present embodiment;

FIG. 14 is a flowchart showing the registering operation of a map object in the present embodiment;

FIG. 15 is a flowchart showing the referencing/updating operation of a map object in the present embodiment;

FIG. 16 is a flowchart showing the deleting operation of a map object in the present embodiment;

FIG. 17 is a flowchart showing the post-processing operation of the present embodiment;

FIG. 18 is a diagram for explaining a shared map object file in a multi-user environment;

FIG. 19 show diagrams for explaining a map data file for a prior art individual point model;

FIGS. 20(a) and 20(b) show diagrams for explaining a map data file for a prior art individual line model;

FIG. 21 schematically shows an arrangement of a prior art map database system;

FIG. 22 is a flowchart showing the processing operation of a prior art map data file; and FIG. 23 is a diagram for explaining a trouble caused by a file competition of a plurality of users in the prior art.

DESCRIPTION OF THE PREFERRED EMBODIMENTS

An embodiment of the present invention will be explained with reference to FIGS. 1 to 18.

Figure 1:
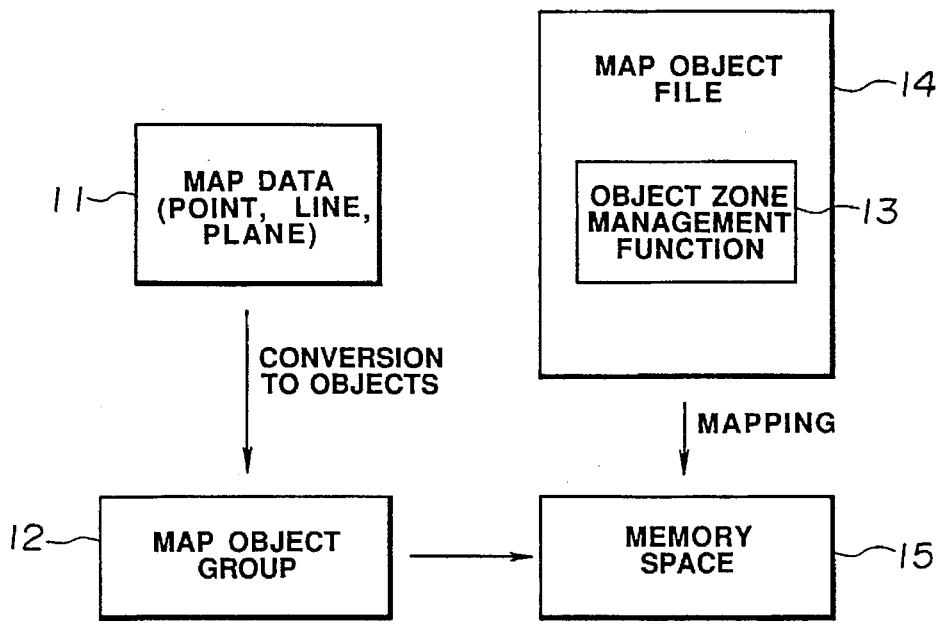
FIG. 1 a diagram for explaining a method for forming a map database in accordance with the present invention.

Referring first to FIG. 1, there is shown a diagram for explaining the schematic operation of a method for forming a graphic database in accordance with an embodiment of the present invention. In the present embodiment, map data is employed as graphic data and explanation will be made as to the processing operation when the map data is formed as a database.

When it is desired to form a graphic database, map data 11 including points, lines, planes, etc. is converted into a group of map objects 12 based on the object oriented language, as shown in FIG. 1. Next, a map object file 14 having an object area managing function 13 (which will be detailed later) of managing the map object group 12 is mapped on a memory space 15. The map object group 12 is registered on the mapped memory space 15 with use of the object area managing function 13. Further, the mapped memory space 15 is accessed to perform such operation as the referencing, updating and deletion of a map object. When the map object group 12 is developed on the memory space 15 in this way, the map object file 14 is formed as a map database.

Figure 2:
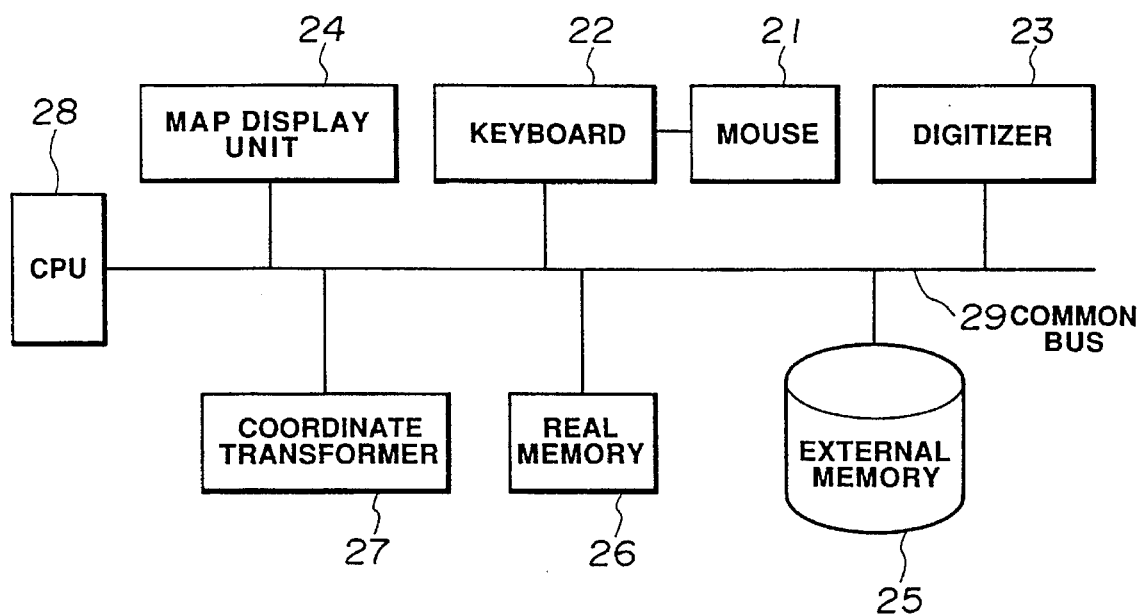
FIG. 2 is a block diagram of a graphic database system in accordance with an embodiment of the present invention.

Shown in FIG. 2 is a block diagram of a graphic database system in accordance with an embodiment of the present invention which is applied to a map database system designed to handle map data or more particularly, to a workstation or a computer or the like.

The graphic database system of FIG. 2 includes a mouse 21 and a keyboard 22 for entering various types of instructions and data, a digitizer 23 for inputting map data, a map display unit 24 such as a display on which the map data is displayed, an external memory 25 for storing therein a map database having map data expressed in a normalized coordinate system, an operating system (which will be referred to as OS, hereinafter), application programs, various types of programs and data, a real memory 26 for storing therein entered data and instructions, and programs and data loaded from the external memory 25, a coordinate transformer 27 for transforming a device-dependent coordinate system into a normalized coordinate system to be used in the database, a central processing unit 28 (which will be referred to as the CPU, hereinafter) for controlling these parts and also performing a predetermined processing operation, these parts being connected through a common bus 29.

The CPU 28 has a memory management unit (MMU) (not shown) for realizing a virtual memory mechanism and a file map function to manage files and memories under control of the memory management of the OS (including, of course, the mapping, paging, swapping, etc. between the file contents and memory space). The CPU 28 also has a may object retrieval function of retrieving the map database and a processing function of performing various operations over map objects such as registering, referencing, updating and deleting according to a demand from an input application under control of the OS.

In the present embodiment, the aforementioned memory means corresponds to the external memory 25 shown in FIG. 2, while the aforementioned mapping means and processing means correspond to the CPU 28 in FIG. 2.

In the present embodiment, the file map function is realized by utilizing the file map function of a "SunOS Release 4.0" as one of OSs. Further, a "C++" language is employed as an object oriented language. However, the present invention is not limited to the specific language but another object oriented language may be employed as necessary.

In the "C++" language, a structure having an information hiding function is called "class" and in the declaration of the class (structure declaration), the "class" is described as the type name of the structure.

For example, it is known that, a structure declaration is expressed as follows.

```
class Class Name {
        Type Variable Name;
        .
        .
public:
        .
        Method Name ( )
        .
        .
} ;
```

Figure 3:
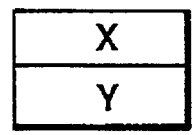
FIG. 3 shows an example of a program representing a structure declaration to express coordinates (point) in the present embodiment.
Figures 5, 6A, 6B:
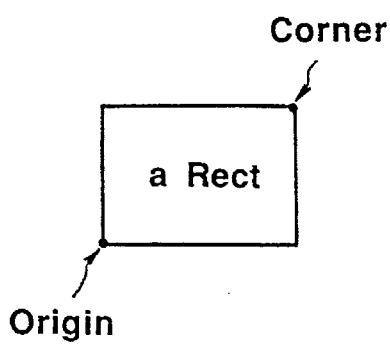
FIG. 5 shows an example of a program representing a structure declaration to express a rectangle in the present embodiment.
FIGS. 6(a) and 6(b) show diagrams for explaining a map object in the present embodiment.

Therefore, for converting map data into an object, when it is desired to make a structure declaration for a coordinate (point), a rectangle, or a string of coordinate points (polygon) with use of the "C++" language; the coordinate point is expressed in such a manner as shown in FIG. 3, the rectangle is expressed as shown in FIG. 4, and the coordinate string is expressed as shown in FIG. 5.

That is, a coordinate point is expressed, for example, a program which follows.

```
// Coordinate
class Point {
        double     X,
                   Y ;
    public:
        .
        .
        .
} ;
```

The lines following the above symbol "//" denote comment lines and the above symbol "// Coordinate" represents that a part following the "class Point" is a comment indicative of a structure declaration for the coordinate.

With such a structure declaration, a coordinate point "a point" in FIG. 4(a) is expressed as such a map object (X and Y coordinate values) as shown in FIG. 4(b). Such a map object as expressed in this manner is used to express, for example, the position of a target, the position of a symbol "+" indicative of a church, the position of a symbol " " indicative of a post office or so on in a map.

A rectangle is expressed by the following program.

```
// Rectangle
classRectangle {
    Point origin,        //Left lower coordinate
         corner:         //Right upper coordinate
    public :
        .
        .
        .
} ;
``` where, the above "//Rectangle" is a comment indicative of the fact that a part following the "classRectangle" is a structure declaration, the above "//Left lower coordinate" is a comment indicative of the fact that the "Point origin" is a left lower coordinate, and the above "//Right upper coordinate" is a comment indicative of the fact that the "Point corner" is a right upper coordinate.

With such a structure declaration, the rectangle "a Rect" shown in FIG. 6(a) is expressed as such a map object as shown in FIG. 6(b). In the example shown in FIG. 6(b), more specifically, an "origin" having an X-Y coordinate point or position (X1, Y1) is associated with a "corner" having an X-Y coordinate point or position (X2, Y2) to express the object.

Further, a coordinate string (polygon) is expressed by a program which follows.

```
//Coordinate string (Polygon)
classPath {
    Rectangle    box ;    //Boundary rectangle of
                          coordinate string
    int          npts :   //Number of apexes
    Point        ptlist [1] //Variable length
                 object
    public :
        .
        .
        .
};
``` where, the "//Coordinate string (Polygon)" is a comment indicative of the fact that a part following the "classPath" is a structure declaration for the coordinate string (polygon), the "//Boundary rectangle for coordinate string" is a comment indicative of the fact that the "box" is a boundary rectangle for coordinate string, the "//Number of apexes" is a comment indicative of the fact that the "npts" is the number of apexes, and the "//Variable length object" is a comment indicative of the fact that the "ptlist [1]" is a variable length object.

Figures 7, 8A, 8B:
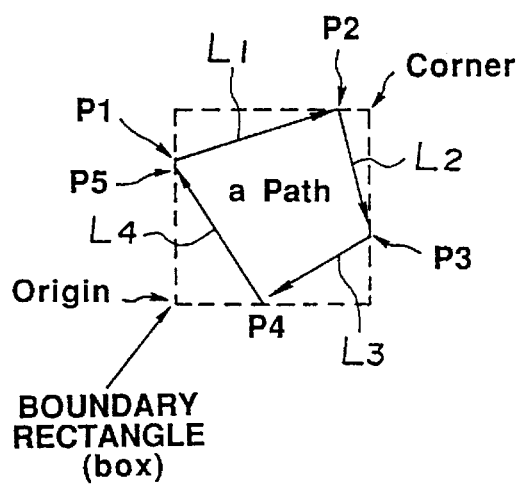
FIG. 7 shows an example of a program representing a structure declaration to express a string of coordinate points (polygon) in the present embodiment.
FIGS. 8(a) and 8(b) show diagrams for explaining a map object in the present embodiment.

With such a structure declaration, the coordinate string "a Path" shown in FIG. 8(a) is expressed as such a map object as shown in FIG. 8(b). In FIG. 8(a), more specifically, the number of apexes is a total of 5, that is, a start point P1 of a line segment L1, a start point P2 of a line segment L2, a start point P3 of a line segment L3, a start point P4 of a line segment L4, and an end point P5 of the line segment L4 (which point P5 is the same as the start point of the line segment L1). In the object example of FIG. 8(b), a boundary rectangle "box" is expressed by an "Origin" having an X-Y coordinate point or position (X1, Y1) and a "Corner" having an X-Y coordinate point or position (X2, Y2); the number "npts" of elements (apexes) of a polygon coordinate string "a Path" is 5; and "ptlist[0]" to "ptlist[3]" corresponding to the start points P1 to P4 have X-Y coordinate values (X1, Y1) to (X4, Y4) respectively and "ptlist[4]" corresponding to the end point P5 has X-Y coordinate values (X5, Y5). Such a map object as expressed in this way is used to express, for example, a street, a building, a road, an administrative area, etc. in a map.

Figure 9:
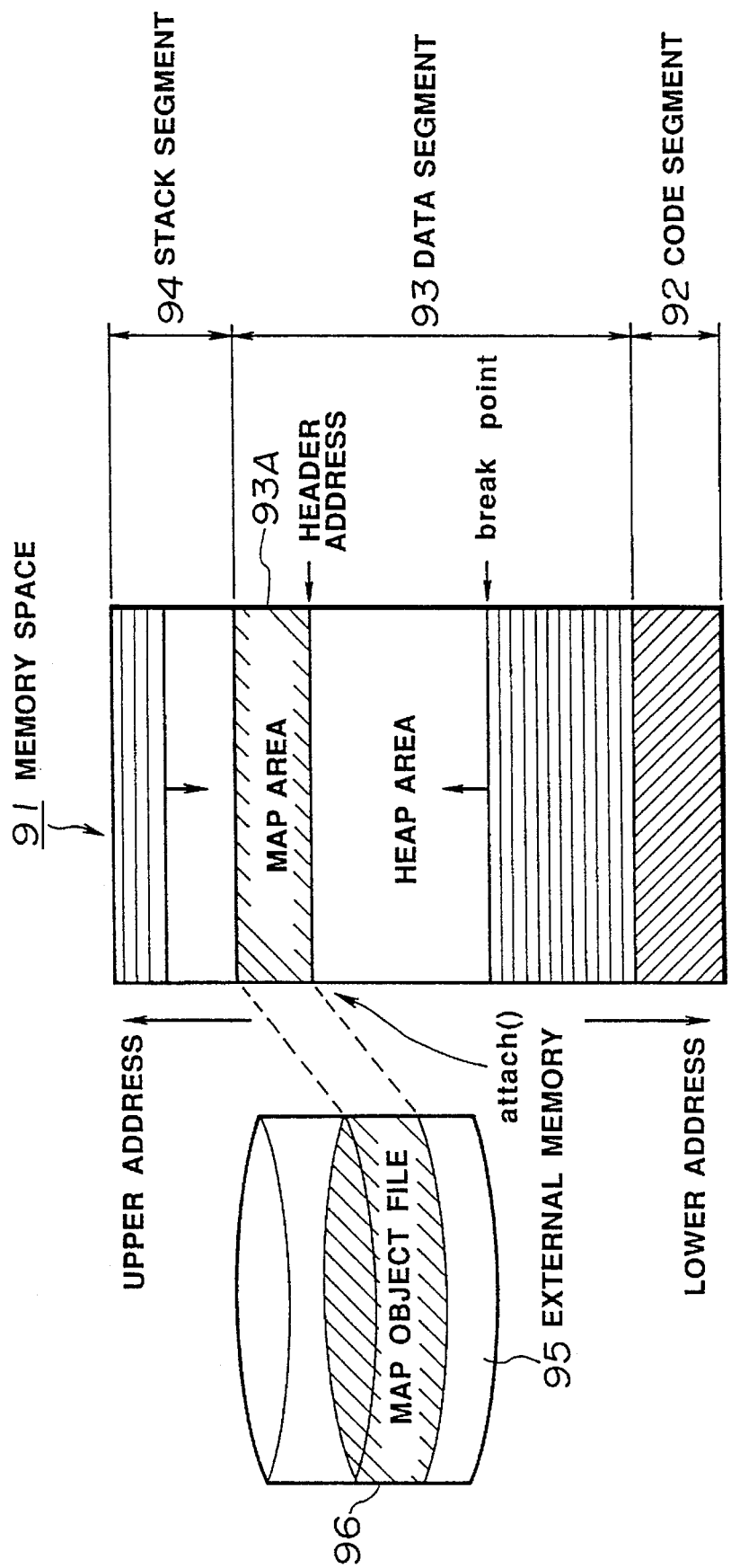
FIG. 9 shows the conception of a memory mapped file in the present embodiment.

Referring next to FIG. 9, there is shown a diagram for explaining the conceptional structure of a memory map file in the aforementioned graphic database system.

In FIG. 9, a memory space 91 has such a structure that a code segment 92, a data segment 93 as a head area and a stack segment 94 are allocated in the order sequentially from a lower address to an upper address. An external memory 95 has a map object file 96 stored therein.

The map object file 96 in the external memory 95 is assigned to the data segment 93 of the memory space 91 according to a command "attach call". The heading address of a map area 93A then allocated is hereinafter used to calculate a real address on the basis of an offset for the map object file 96.

The map object file 96 is divided into a map object table for registering therein such data for management of map objects as the identification data of the map objects, and a map object pool as a memory pool for storing therein actual map objects. An example of the structure of such a map object file is shown in FIG. 10.

Figure 10:
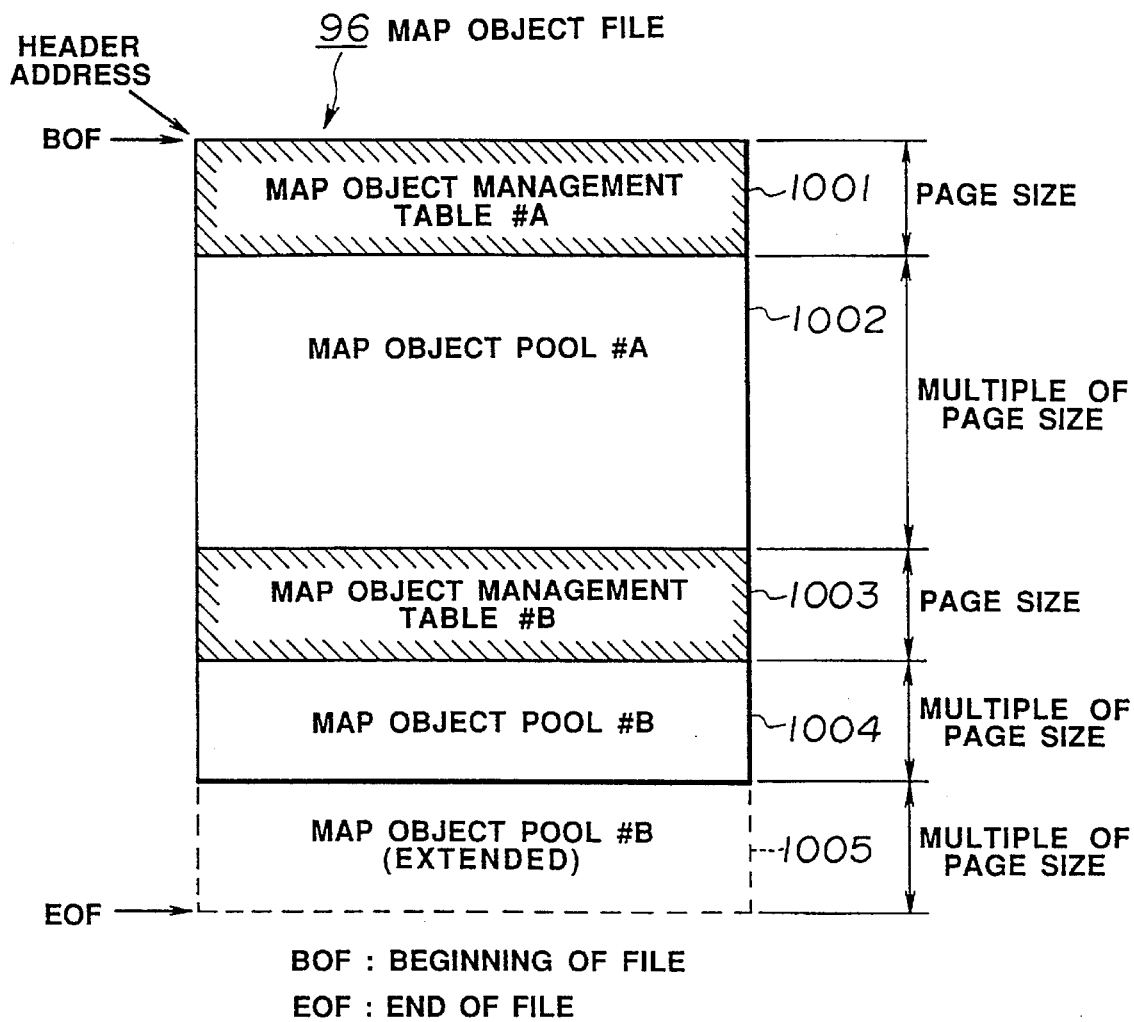
FIG. 10 shows the entire structure of a map object file in the present embodiment.

The map object file 96 shown in FIG. 10, in more detail, is divided into map object tables 1001 and 1003 and map object pools 1002, 1004 and 1005. Each table is set to have a size corresponding to one page, while each pool is set to have a size corresponding to a multiple of one page. Each table performs such an object area managing function 13 (refer to FIG. 1) as mentioned earlier.

With the illustrated map object file 96, since the number of map objects exceeds the number of map objects which the map object table 1001 can manage, the map object table 1003 is extended with a size corresponding to one page. Further, since the map object pool 1002 did not have an idle area sufficient to register required map objects, the map object pool 1004 is extended with a size corresponding to a multiple of one page.

In the illustrated example, if the number of map objects is in a range manageable by the map object table 1003, but is not able to be registered in the map object pool 1004 because the size (area) of the map object pool 1004 is small, then an additional map object pool 1005 may be extended with a size corresponding to a multiple of one page, as shown by a dotted line in FIG. 10.

In the map object table 1001, there is set a pointer to the next map object management table, i.e., in the present example, to the map object table 1003. Similarly, a NIL pointer indicative of the absence of the next map object management table (the last table) is set in the map object table 1003.

Figure 11:
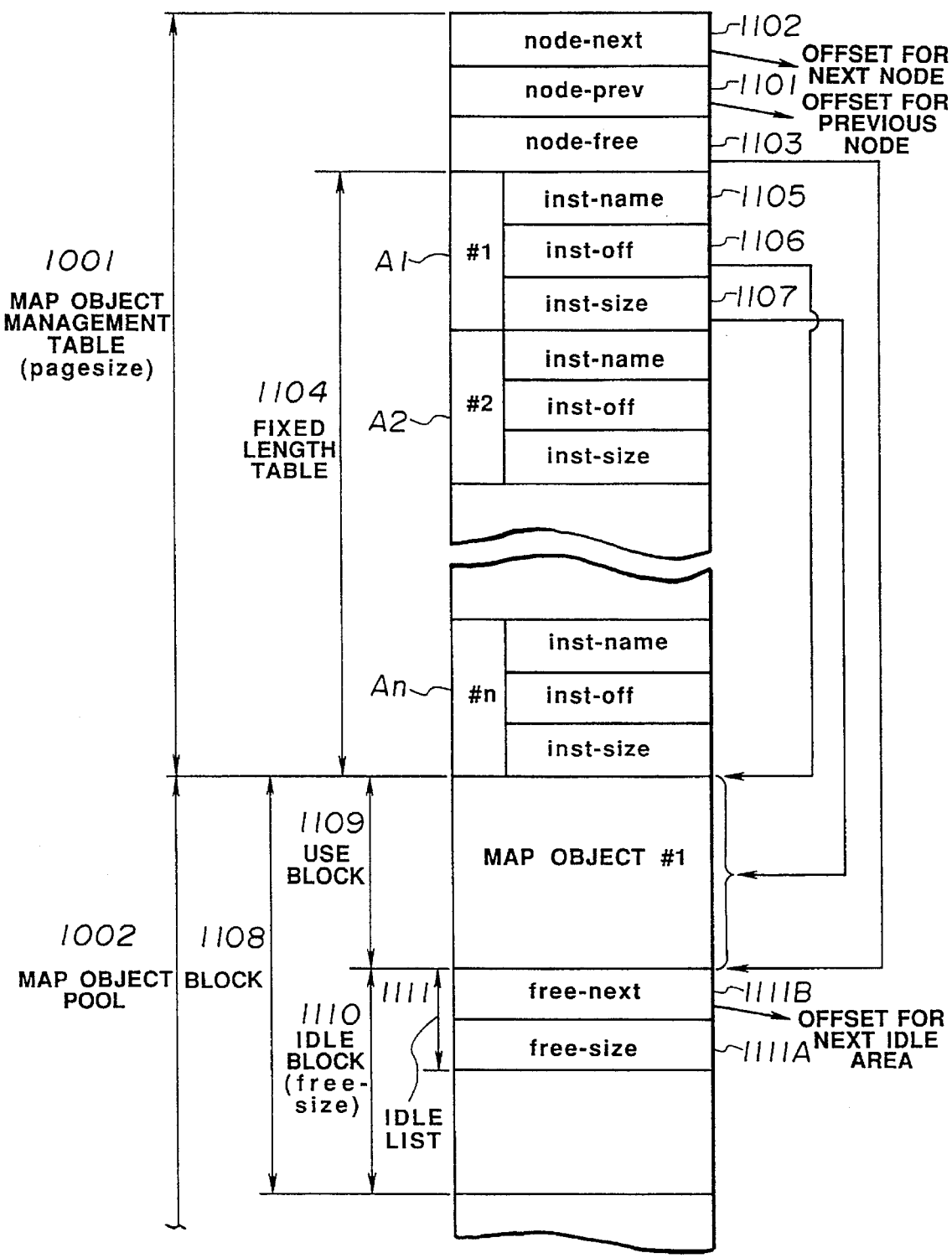
FIG. 11 shows a detailed structure of the map object file in the present embodiment.
Figure 10:
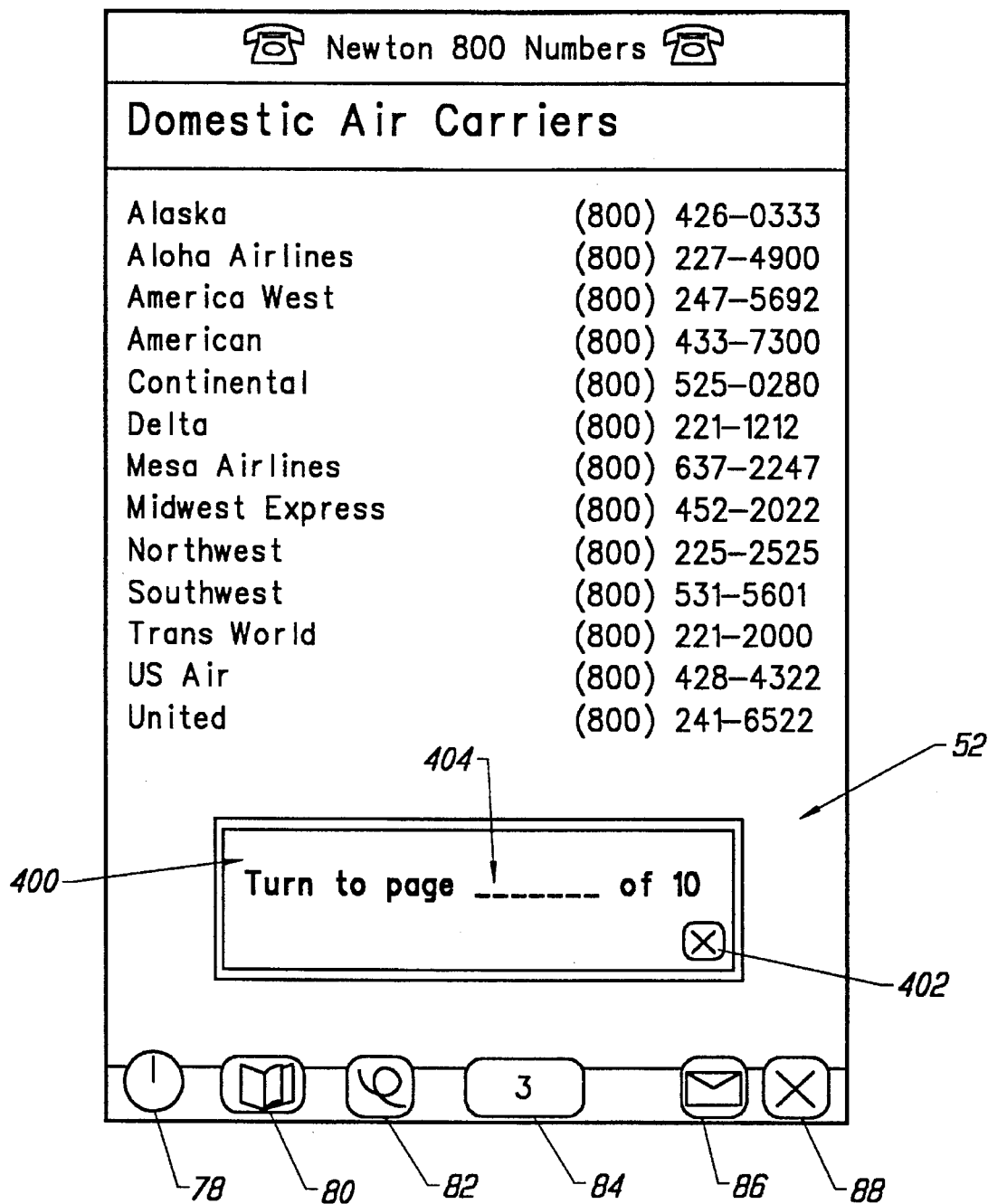
Figure 11:
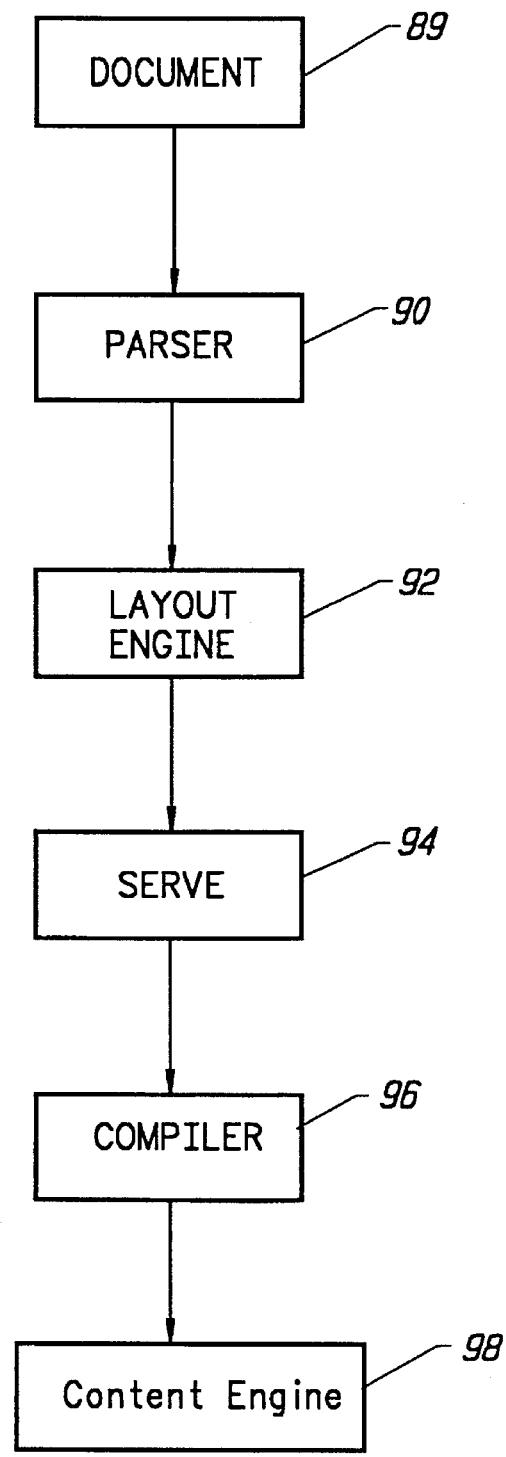

FIG. 11 shows a further detailed structure of the map object file 96 of FIG. 10. In FIG. 11, the map object table 1001 comprises an entry 1101 for an offset ("node-prey" in FIG. 11) to the previous node (that is, map object table), an entry 1102 for an offset ("node-next" in FIG. 11) to the next node (that is, map object table), an entry 1103 for an offset ("node-free" in FIG. 11) to an idle list, and a fixed length table 1104 of n of preset areas A1, A2 . . . and An having data on respective map objects registered therein on every map object basis.

Each of the elements or areas of the fixed length table 1104, for example, the area A1 has an entry 1105 for inherent data "inst-name" in FIG. 11) such as identification data (ID) for discrimination of specific one of map objects, an entry 1106 for an offset ("inst-off" in FIG. 11) to the map object, and an entry 1107 for the length ("inst-size" in FIG. 11) of the map object.

When the number of map objects exceeds the number n of manageable map objects, a new map object management table is extendedly generated at the end of the file. The extended map object management table also have substantially the same structure as the map object table 1001. In the case of the structure shown in FIG. 10, for example, an offset value to the map object management table 1003 is set at the entry 1102 (refer to FIG. 11) of the map object management table 1001, while an offset value to the map object management table 1001 is set at the entry 1101 (refer to FIG. 11) of the new map object management table 1003. In this way, the offset to the previous table and the offset to the next table cause the already existing map object management table to be combined with the extended map object management table.

On the other hand, the map object pool 1002 is made in the form of blocks, that is, divided into use blocks for storing therein actual map objects and idle blocks which are not used. In the initial state, all the blocks are idle blocks each of which is managed by an idle list having an entry for the size of the idle block and an entry for an offset for the next idle block.

In the map object pool 1002 shown in FIG. 11, the actual map objects are stored in a header block 1108. The block 1108 is made up of a use block 1109 for storing therein, for example, such a map object as shown in FIG. 8(b) and an idle block 1110.

The size of the use block 1109 is equal to the size of a map object to be registered.

The idle block 1110 is managed by an idle list 1111 which has an entry 1111A ("free-next" in FIG. 11) for the size of the idle block and an entry 1111B for an offset ("free-size" in FIG. 11) to the next idle block.

In the entry 1111A, there is set a value indicative of the size of the idle area when the map object pool is divided into blocks before registering the map object (in this case, indicative of the size of the block 1108). After the map object is registered, however, a value corresponding to a subtraction of the size of the map object to be registered from the size of the idle area (in this case, indicative of the size of the idle block 1110) is set in the entry 1111A.

Further, when the map object registered in the use block 1109 is released, the value indicative of the size of the idle area when blocked is set in the entry 1111A. That is, under control of the idle list, the non-use block is combined with the returned block (which map object so far registered therein is released) for management.

Since the other blocked block (which is an idle block in the initial state) following the header block has also the same structure as the aforementioned header block, the similar processing is carried out for the subsequent blocks.

The map object pool 1002 having such an arrangement as mentioned above is referenced by an offset from the map object management table 1001. More specifically, each block having an actual map object stored therein is referenced by an offset value set in an entry (having an offset "inst-off" to the map object in the area including en entry in which the ID of the map object is set) for one of the element areas of the fixed length table 1104 corresponding to the entry 1106.

Further, only the idle list 1111 of the header block 1108 is referenced by the offset value of the entry 1103 of the map object management table 1001, and the idle list of the other block is referenced by the offset value in an entry (having an offset "free-next" to the next block) corresponding to the entry 1102. However, the value of an entry of the idle list of the last idle block corresponding to the entry 1102 is "nil".

In the case where a block is demanded for a new map object, when an idle area is present in the map object pool, the object is transferred therefrom; whereas when no idle area is present, the map object pool is extended at its last to add the object to the idle list and to be transferred therefrom. For example, when an idle area enough to store the new map object is not present in the map object pool 1004 as shown in FIG. 10, a map object pool 1005 is extendedly provided.

In this connection, in FIG. 10, the extensive provision of the map object table 1003 is not followed necessarily the extensive provision of the map object pool 1004. That is, in the case of the presence of an idle area (idle block) in the map object pool 1002, when the map object is stored in the idle area and the rest idle area cannot store a new map object to be registered, the map object 1004 is extendedly provided.

With such a structure as mentioned above, the processing operation of the map data system under control of the CPU 28 will next be explained by referring to flowcharts of FIGS. 12 to 17.

Figure 12:
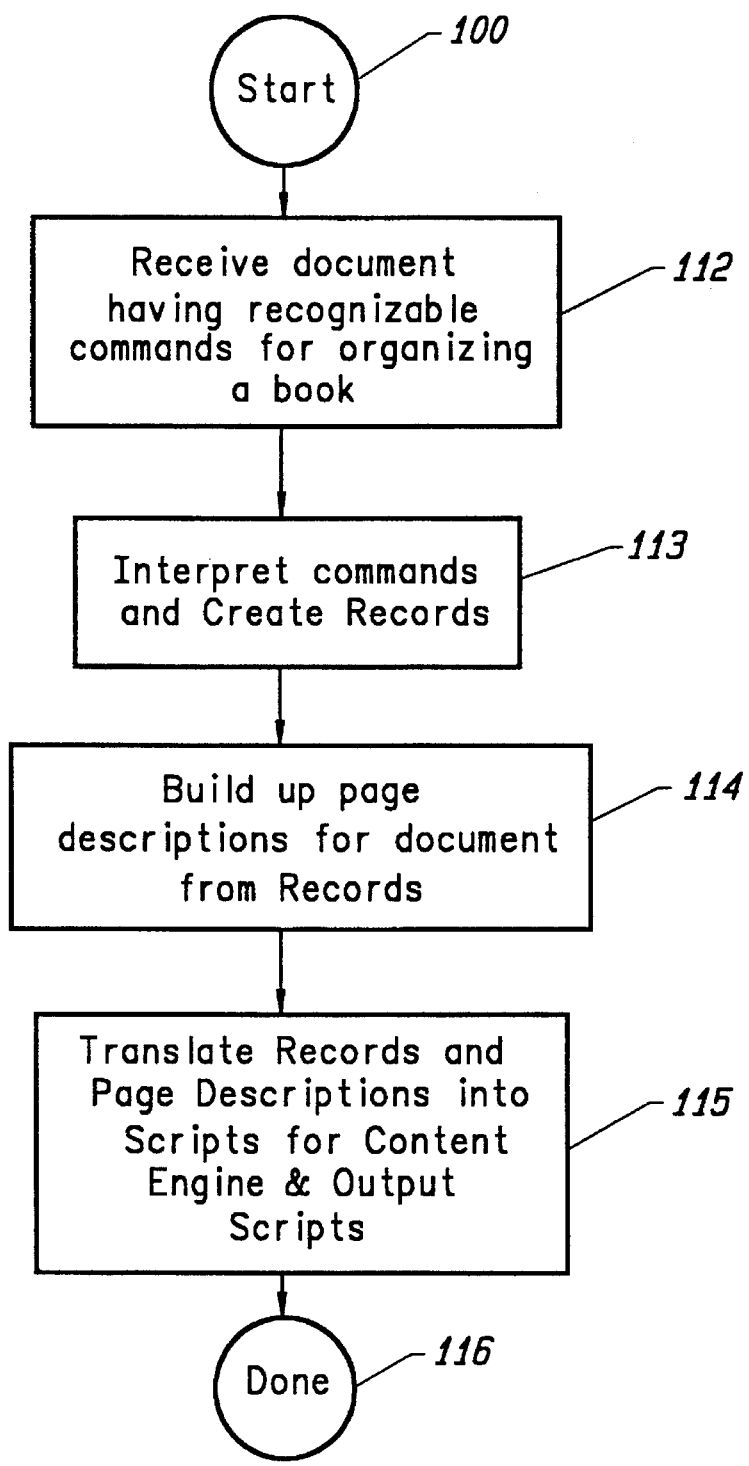
FIG. 12 is a flowchart showing a general flow of processing operation in the present embodiment.

First, a general flow of processing operation will be explained. As shown in FIG. 12, when a command "attach ()" is input, the CPU 28 calls a mapping subroutine in which a "mmap ()" system call is built, and maps, as a pre-processing operation, the map object file 96 on the memory space 91 according to the subroutine (step 1201).

The CPU 28 then accesses the mapped memory area, i.e., the mapped area 93A of the memory space 91 to perform main processing operations (including the registration, referencing/updating and deletion for the map object) over the map object file 96, and repeats such main operations until the operations for the file are completed (steps 1202 and 1203).

And the CPU 28, when receiving a command "detract()", calls an unmapping subroutine in which a system call "mumap ()" is built, and unmaps, as a post-processing, the map object file 96 and the memory space 91 (step 1204).

Figure 13:
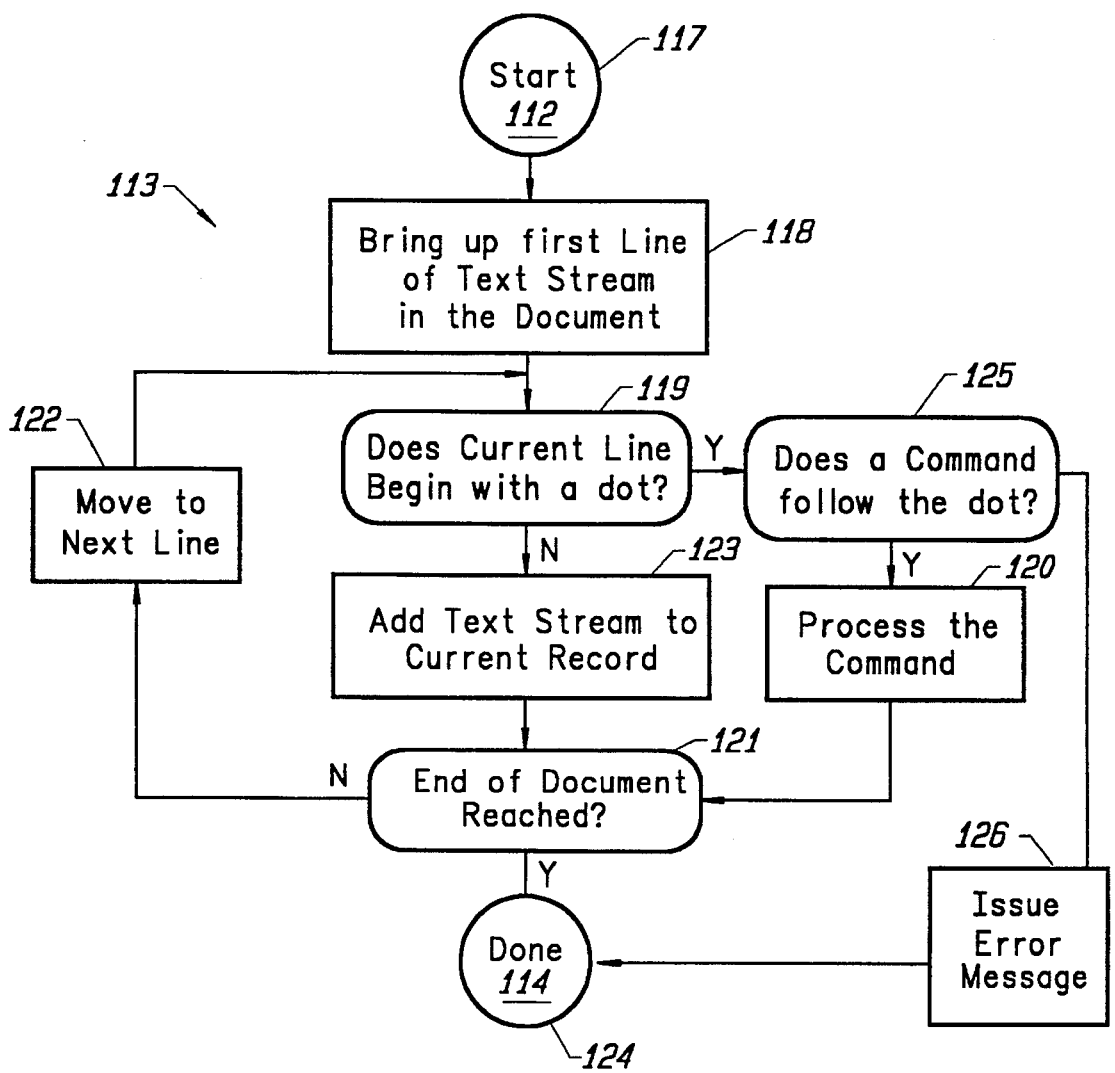
FIG. 13 is a flowchart showing the pre-processing operation of the present embodiment.

In the pre-processing step 1201 of FIG. 12, the CPU 28, as shown in FIG. 13, opens the map object file 96 for the map data (points and polygons) according to the aforementioned mapping subroutine (step 1301) and thereafter, maps the map object file 96 on the memory space 91 and defines the leading address of the mapped memory space as a header address (step 1302).

Explanation will then be made sequentially as to the main operations of the CPU 28, that is, the registration, referencing/updating and deletion of the map object.

In the registering operation, as shown in FIG. 14, the CPU 28 first checks whether or not an idle area is present in the map object management table 1001 (shed 1401), and if the idle area is absent, performs the extending operation of the map object management table (step 1402).

The CPU 28, when finding an idle area in the shed 1401 or completing the step 1402, examines the presence or absence of an idle block in the map object pool 1002 (step 1403). The absence of an idle block causes the CPU 28 to perform the extending operation of the map object pool (step 1404).

The presence of an idle block in the step 1403 or the completion of the step 1404 causes the CPU 28 to obtain the memory block necessary to store the map object requested by the application from the map object pool on the basis of an idle list starting with the entry 1103 of the header object management table (step 1405).

And the ID of the map object to be registered, the offset to the obtained block, and the length (bite number) of the map object to be registered are registered in entries, corresponding to the entries 1105, 1106 and 1107 respectively, of the object management table; and thereafter the offset is converted into a real address which is returned to the application.

More specifically, the CPU 28 adds together the header address and an object relative address (offset), defines the addition value as an absolute address (real address), and returns the real address to the application (step 1406). The application copies the map object to be registered at the returned real address (step 1407).

The CPU 28, in the referencing/updating operation shown in FIG. 15, then compares the ID of the map object requested by the application with the ID of the map object set in the "inst-name" entry inherent to the map object within the map object management table 1001 to search the same ID (step 1501). The CPU 28 converts the offset value set in an entry corresponding to the entry 1106 of the thus obtained ID as well as an area expressed in terms of byte number set in an entry corresponding to the entry 1107 into real addresses, and returns these real addresses to the application. That is, the CPU adds together the header address and the object relative address and returns the addition value to the application (step 1502). With this, the application is able to reference/update the real address as the map object.

Subsequently, in the deleting operation shown in FIG. 16, the CPU 28 compares the ID of the map object requested by the application with the ID of the map object set in an entry corresponding to the entry 1105 of the map object management table 1001 to search the same ID (step 1601). The CPU then adds in an idle list a memory block of the map object pool 1001 so far occupied by the map object to be deleted to delete the corresponding map object from the map object management table 1001 (step 1602). The memory block added in the idle list can be put in its re-usable state.

Finally, the post-processing will be explained. As shown in FIG. 17, the CPU 28 unmaps the map object file 96 and the memory space 91 according to the aforementioned unmapping subroutine (step 1701) and then closes the map object file (step 1702).

Explanation has been made as to how to process when the map object file (map database) locally exists in the external memory in the foregoing embodiment. Next explanation will be directed to how to process when the map object file globally exists in the external memory.

FIG. 18 shows a so-called multi-user environment in which a plurality of users share the map object file present on a network.

In FIG. 18, such a local area network (which will be referred to as the LAN, hereinafter) 1801 as, e.g., an Ethernet is connected with a server machine 1802 having an external memory 1802A functioning of storing therein a map database or map object file and also with a client machine 1803.

A network file system (which will be referred to as the NFS, hereinafter) is set in each of the server and client machines 1802 and 1803.

The NFS is a function of forming a network-transparent file system, which function is well known (for example, SunOS Release 4.0). The NFS setting of the server side work and the client side work can be carried out with use of the known technique and thus explanation thereof is omitted.

When the NFS is set on both the server and client sides, the client machine 1803 performs a predetermined procedure to open the map object file in the external memory 1802A of the server machine 1802 through the LAN 1801 and to map the contents of the file on the locally existing memory space 1803A. The processing after the mapping can be carried out in substantially the same manner as for the aforementioned processing. Of course, the server machine 1802 also can map the map object file in the external memory 1802A on the locally existing memory space 1802B as mentioned above.

It goes without saying that, when a plurality of users sharing the database access the database, a semaphore is used.

In the aforementioned embodiment, a specific map object (polygon) can be retrieved by designating a desired position on the map displayed on the map display unit 24 with use of the mouse 21. In more detail, the coordinate transformer 27 transforms the coordinate values of a point on the map on the display screen of the map display unit 24 designated by the mouse 21 into corresponding coordinate values in the normalized coordinate system. The CPU 28 retrieves the corresponding specific map object (polygon) from the map object file on the basis of the transformed coordinate values.

The retrieving operation of the specific map object (polygon) may be realized, for example, by examining whether or not the transformed coordinate values are included within the boundary rectangle "box" (refer to FIG. 8(*a*)) of the map object. In other words, this is realized, for example, by checking whether or not the transformed coordinate values are included within the boundary area "box" defined by the "Origin" coordinate values (X1, Y1) and the "Corner" coordinate values (X2, Y2) in the item "box" of FIG. 8(*b*). If the transformed values are included within the boundary area, then by knowing an offset "inst-off" referencing a block in which the specific map object is stored, an inherent data (ID) "inst-name" combined with the offset "inst-off" can be specified.

Although the map data has been employed as graphic data in the foregoing embodiment, the present invention is not limited to the specific example, but any data may be handled so long as the data are included in the graphic data. For example, as the graphic data, data on design drawing designed by a computer aid design (CAD) may be used.

As has been explained in the foregoing, in accordance with the present embodiment, since map data are converted into map objects which form a database and a file as the database is mapped on the memory space, the file input/output of the map data can be apparently or virtually eliminated and the need of such special processing as data conversion, which has so far been necessary for the file input/output, that is, code conversion in the pre- processing and post-processing can be eliminated and thus its overhead can be suppressed to its minimum level.

Further, in a distributed processing/multi-user environment, even when a plurality of users access a file and thus a file competition takes place, since a change in the contents of the map data reflects on the map object file, the plurality of users can reference and update the-map data at the same time. In particular, the use of the NFS enables the user to know the renewed map data on a real time basis, which results in that efficient working on the network can be realized.

Further, since map data are stored in a database in the form of map objects, such map data that becomes necessary for developing a city or a local area, for example, map data expressing an anti-fire area, a residential area or a commercial area can be easily generated.

Note that "SunOS" is a trademark of the Sun Micro Systems Ltd. (U.S.A.) and "NFS" is a registered trademark of the Sun Micro Systems Ltd.

As has been disclosed in the foregoing, in accordance with the present invention, the contents of a file having a group of graphic objects registered therein are mapped on the memory space so that the accessing of the mapped memory space causes reading/writing of the graphic object from into the file, whereby the need for code conversion, which has been necessary in the prior art, can be eliminated and thus the overhead of the system can be remarkably reduced.

Further, when a change in the map data on the mapped memory space takes place, the modification contents reflect on the file. As a result, even when a file competition occurs at the time of accessing operation in a distributed processing/multi-user environment, file matching can be maintained.

The present invention can be modified in various ways without departing the spirit and major features of the invention. Therefore, it should be appreciated that the foregoing embodiment is disclosed merely as an example and the present invention should not be restricted by the embodiment. The scope of the present invention is defined by the scope of the attached claims and should not be restricted by the body of the specification. Further, the present invention covers all equivalents, alternations and modifications included in the scope of the appended claims.

What is claimed is:

1. A graphic database system comprising:

external storage means for storing therein a graphic object file in which graphic data expressed as an object in terms of a predetermined description based on an object oriented language is registered;

mapping means for mapping a memory space of the graphic object file stored in the external storage means on a memory space of a virtual memory area which is accessed by a logical address;

real memory means having a memory space and which is accessed by a real address;

memory management means for said memory space matching said memory space of the real memory means, corresponding to the memory space mapped by the mapping means and the memory space of the graphic object file stored in the external storage means; and processing means for accessing the memory space of the real memory means which has been matched by the memory management means in correspondence with an access to the memory space of the virtual memory area which has been mapped by the mapping means to thereby execute processing, selected from the group consisting of registration, retrieval, updating and deletion of the graphic data in the external storage means.

2. The graphic database system as set forth in claim 1, wherein the graphic data is map graphic data indicative of constituent element graphics of a map.

3. The graphic database system as set forth in claim 1, wherein the graphic object file comprises:

a graphic object pool area for registering therein a plurality of graphic objects corresponding to predetermined graphic data; and a graphic object management table storage area for storing therein a graphic object management table which manages registration locations of the plurality of graphic objects registered in the graphic object pool area, and wherein the memory management means, by referring to the graphic object management table, performs matching of the memory space of the real memory corresponding to the virtual memory area mapped by the mapping means and the memory space of the graphic object file stored in the external storage means.

4. The graphic database system as set forth in claim 3, wherein the graphic object management table storage area has a predetermined page size, the graphic object pool area has a size of multiple times of the predetermined page size, and the memory management means performs, on the unit page basis, the matching of the memory space of the real memory corresponding to the virtual memory area mapped by the mapping means and the memory space of the graphic object file stored in the eternal storage means.

5. The graphic database system as set forth in claim 3, wherein the graphic object management table storage area is extended by the unit size of one page when no room is left in the graphic object management table.

6. The graphic database system as set forth in claim 3, wherein the graphic object management table storage area is extended by the unit size of multiple pages when no room is left in the graphic object management table.

7. The graphic database system as set forth in claim 3, wherein the graphic object management table comprises a fixed length table for storing:

a first offset value indicative of a relative storage location of the graphic object management table corresponding to a previous graphic object pool of the graphic object pool corresponding to the graphic object management table;

a second offset value indicative of a relative storage location of the graphic object management table corresponding to a next graphic object pool of the graphic object pool corresponding to the graphic object management table; and graphic object unique data composed of identification data for identifying each of graphic objects corresponding to a plurality of graphic objects registered in the graphic object pool corresponding to the graphic object management table, a third offset value indicative of a relative storage location of the graphic object with respect to the graphic object management table, and size data indicative of a size of the storage area of the graphic object.

8. The graphic database system as set forth in claim 3, wherein the graphic object registration area is divided into blocks of a predetermined size, and wherein the blocked graphic object registration area comprises a used block with the graphic object being registered therein and an idle block with no graphic object being registered therein.

9. The graphic database system as set forth in claim 8, wherein the graphic object management table, when the graphic object registered in the used block is deleted, connects the used block from which the graphic object is deleted with the idle block to manage the connected block as an idle block.

10. A method of forming a graphic database, comprising the steps of:

expressing graphic data as an object in terms of a predetermined description based on an object oriented language;

preparing a graphic object file in which the graphic data as the object is registered and registering the prepared graphic object file into external storage means;

mapping a memory space of the graphic object file registered in the external storage means on a memory space of a virtual memory area which is accessed by a logical address;

matching a memory space of a real memory corresponding to the mapped virtual memory area and the memory space of the graphic object file stored in the external storage means; and executing processing selected from the group consisting of registration, retrieval, updating and deletion of the graphic data in the external storage means by accessing the memory space of the real memory which has been matched in correspondence with an access to the memory space of the mapped virtual memory area.

* * * * *